United States Patent Office 3,562,220
Patented Feb. 9, 1971

3,562,220
BASE-MODIFIED AROMATIC POLYAMIDES
Carl K. McMillin, Wilmington, Del., assignor to E. I. du Pont de Nemours and Company, Wilmington, Del., a corporation of Delaware
No Drawing. Filed Dec. 15, 1967, Ser. No. 690,785
Int. Cl. C08g 20/00
U.S. Cl. 260—78                                  2 Claims

ABSTRACT OF THE DISCLOSURE

Composition comprising an aromatic polyamide modified by the presence of tertiary amino or quaternary ammonium groups wherein the tertiary amino or quaternary ammonium groups are present as divalent repeat units co-condensed with divalent aromatic amide radicals or as an amide compound containing at least three aromatic rings said compound being in admixture with the aromatic polyamide. Such a composition is dyeable with acid dyes and is especially suitable for use in the form of fibers from which dyed fabrics having high temperature resistance can be made.

BACKGROUND OF THE INVENTION

Aromatic polyamides have been found well-suited for a broad range of utility where exposure to high temperatures is involved. Such polymers and shaped structures derived therefrom are shown, for example, in Hill et al., U.S. Pat 3,006,899, Kwolek et al., U.S. Pat 3,063,-966, and Preston U.S. Pat. 3,232,910. One deficiency of these aromatic polyamides is the fact that they are not readily dyeable While many of the uses for such high-temperature-resistant polymers are adequately served by polymers which have not been colored (for uses such as electrical insulation for motors, transformers and the like and other industrial uses such a filter bags, heating ducts, etc.), it would be highly desirable to provide a readily dyeable aromatic polyamide.

Magat U.S. Pat. 3,184,436 discloses a technique for modifying aromatic polyamides to provide improved receptivity for basic dyes. Howver, aromatic polyamides that are receptive to acid dyes have not been available heretofore.

SUMMARY OF THE INVENTION

The present invention provides a composition comprising an aromatic polyamide modified by the presence of tertiary amino groups or quaternary ammonium groups:

(A) At least 85 mol-percent but not more than 96 mol-percent of the chemical repeat units of the constituents of said composition being divalent aromatic amide radicals selected from at least one member of the class:

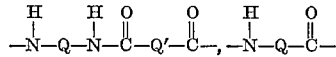

and

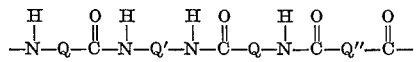

wherein each Q, Q′ and Q″ is the same or a different divalent aromatic radical containing no tertiary amino or quaternary ammonium groups, and wherein each imino and carbonyl group is attached directly to a carbon atom in a ring of said divalent aromatic radicals forming chain-extending bonds which in each Q, Q′ and Q″ are mutually orientated other than ortho, (B) Up to 15 mol-percent but not less than 4 mol-percent of the chemical repeat units of the constituents of said composition being a member selected from the class:

(1) A divalent amide repeat unit containing at least one tertiary amino group or quaternary ammonium group, said repeat units being co-condensed with said divalent aromatic amide radicals, and (2) An amide compound containing at least three aromatic rings and at least one tertiary amino group or quaternary ammonium group, said compound being in admixture with said aromatic polyamide.

The compositions of this invention are dyeable with acid dyes and are especially suitable for use in the form of fibers from which dyed fabrics having high temperature resistance can be made.

DESCRIPTION OF THE INVENTION

The aromatic polyamides used in the present invention are characterized by having chemical repeat units that are divalent aromatic amide radicals of at least one of the following types:

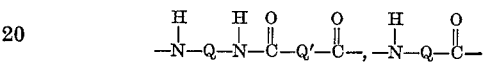

and

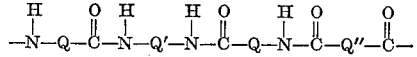

wherein each Q, Q′ and Q″ is the same or a different divalent aromatic radical containing no tertiary amino or quaternary ammonium groups and wherein each imino and carbonyl group is attached directly to a carbon atom in a ring of said divalent aromatic radicals forming chain-extending bonds which in each Q, Q′ and Q″ are mutually orientated other than ortho. The preferred divalent aromatic amide radical is metaphenylene isophthalamide. If desired, aromatic copolyamides may be used which contain two or more different divalent aromatic amide radicals. These aromatic polyamides are disclosed in Hill et al., U.S. Pat. 3,006,899, Kwolek et al., U.S. Pat. 3,063,966 and Preston U.S. Pat 3,232,910.

In the practice of this invention, the aromatic polyamide is modified by the presence of tertiary amino or quaternary ammonium groups. Preferably, this modification is accomplished by co-condensing a polyamide progenitor containing at least one tertiary amino or quaternary ammonium group with the reactants used to prepare the aromatic polyamide. This forms a polymer having divalent amide repeat units containing at least one tertiary amino or quaternary ammonium group co-condensed with the divalent aromatic amide radicals described above. Suitable divalent radicals containing at least one tertiary amino or quaternary ammonium group include, for example:

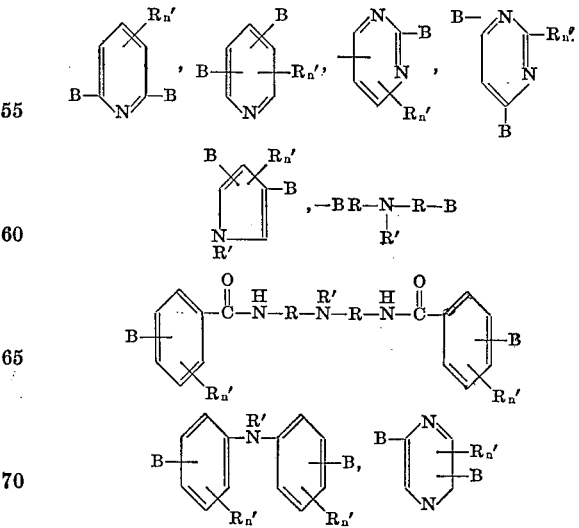

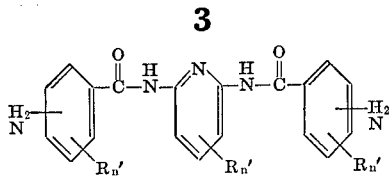

and

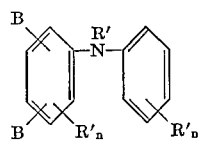

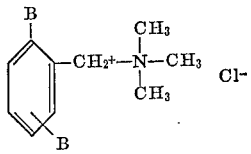

wherein B is selected from the class consisting of

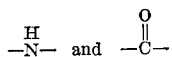

R is alkylene with from 2 to 3 carbons, R' is selected from the class consisting of phenyl and alkyl of 1 to 6 carbons, n is an integer of 0 to 2, and groups B are mutually oriented in positions other than ortho.

It has been found that aromatic amines and either aromatic or aliphatic dicarbonyl chlorides or bromides are satisfactory for solvent co-condensations such as described in the Kwolek et al., U.S. Pat. 3,063,966. Aliphatic diprimary diamines frequently react only once in such media, serving as chain terminators. In a mixed solvent medium, such as employed in Example II described hereinafter, aliphatic diprimary diamines also are found to have the requisite bi-functional activity.

If desired, mixtures of two or more aromatic polyamides may be used, wherein some of the aromatic polyamides contain no tertiary amino or quaternary ammonium groups and some of the aromatic polyamides comprise the divalent aromatic radicals co-condensed with divalent amide repeat units containing at least one tertiary amino or quaternary ammonium group.

Alternatively, the aromatic polyamide may be modified by the admixture presence of a noncondensed compound, which contains at least one tertiary amino or quaternary ammonium group. In this instance, it is necessary that the compound be an amide containing at least three aromatic rings. If the compound contains less than three aromatic rings, it will tend to be extracted from the composition during the usual fiber forming operations.

It is essential that at least 85 mol percent of the chemical repeat units of the constituents of the resulting composition be the defined divalent aromatic amide radicals. Correspondingly, up to 15 mol percent of the chemical repeat units of the constituents of the composition will contain the defined tertiary amino or quaternary ammonium groups. When the aromatic polyamide is modified by the admixture presence of the defined noncondensed amide compound containing at least one tertiary amino or quaternary ammonium group, each compound molecule is regarded as a "chemical repeat unit" for purposes of calculating the amount of the compound in the composition.

The compositions of this invention may be used to prepare various shaped structures such as fibers and films. These compositions are especially suitable for use in the form of fibers because such fibers can be used to prepare dyed fabrics having high temperature resistance. To prepare fibers having acceptable dyeability, it is essential to employ a special process. This process comprises extruding the composition of this invention to form a fiber, and, thereafter, drawing the fiber to about 200% to 600% of the original extruded length. Thereafter, the extruder fiber is relaxed by heating in the absence of tension to permit it to shrink to a final length of about 125% to 450% of the original extruded length. This relaxation step may be accomplished, for example, by steaming under a pressure of 5 to 25 p.s.i.g. (0.35 to 1.8 kg./cm.$^2$) or dry heating at 220° C.–280° C. for about one minute or less. Longer heating periods can be used if desired. The relaxation step can be performed upon the drawn fiber, before or after drying, or upon yarn, staple or fabric prepared from the drawn fiber. If desired, the fiber may be treated in an ordinary steam crimper to effect relaxation and crimping simultaneously.

When the aromatic polyamides used in the composition of this invention are highly consolidated by heat, they are not penetrated by dyes available in the trade to a useful extent. The utility of fibers of such highly consolidated aromatic polyamides in commercial processes for dyeing is enhanced by use of superatmospheric pressure and a dye promoter. Useful dye promoters include dimethyl terephthalate, benzanilide, β-naphthol, diphenyl sulfone, salicylic acid, salicylanilide, dimethyl phthalate, dimethyl isophthalate, benzyl alcohol, benzoic acid, o - phenyl phenol, and mixtures thereof. The compound or mixture employed as a dye promoter must have sufficient affinity for the aromatic polyamide fiber that it is absorbed by the fiber to an appreciable extent despite the tendency of many of the materials to form a stable solution in water under the conditions employed. It is recognized that not all of the materials which are suitable for use as a dye promoter for a fiber comprising a given aromatic polymer will be suitable for use as a dye promoter for fibers of all other polymers. The requirements are less severe in selection of a promoter for dyeing of a fiber comprising a highly modified polymer, and a broader range of promoters is found suitable.

EXAMPLES

The invention is further illustrated in the following examples which are not to be construed as limitative.

EXAMPLE I

To a nitrogen-blanketed solution of 100 parts meta-phenylenediamine (MPD) in 1050 parts dimethyl acetamide (DMAc) which has been cooled to −20° C. is slowly added 189 parts of a .94/.06 molar mixture of isophthaloyl chloride/pyridine 2,5 - dicarbonyl chloride (I/2,5-Py). The resulting viscous solution is neutralized by the addition of 69 parts dry lime slurried in an additional 117 parts of DMAc. The solution is vacuum-deaerated with elimination of 180 parts of DMAc containing a small amount of water, after which it contains 19.5% of a copolymer of MPD-I/MPD-2,5-Py in a 94/6 molar ratio having an inherent viscosity of 1.58, as measured at 25° C. in DMAc containing 4% LiCL.

The solution is dry-spun by means available in the art to 160 denier, 18-filament yarn which subsequently is drawn to 316% of its as-spun length in hot water, which also extracts the residual solvent and salt, and dried for 5.7 seconds over rolls heated to 100° C.

The yarn is knitted on a Stoll knitting machine and the resulting knitted fabric is relaxed at 240° C. for 30 minutes under conditions of no restraint. The relaxed fabric is dyed with an acid dye under a pressure of 15 p.s.i.g. for two hours, the ratio of dye bath to tubing being 50/1 by weight. The dye bath has the following composition:

|  | Part |
|---|---|
| CI Acid dye 68215 | 0.1 |
| Dye assistant [1] | 1.0 |
| Wetting agent | 0.1 |
| Sulfuric acid to pH 1.6. | |
| Water to 100 parts. | |

[1] Equal-weight mixture of dimethyl terephthalate and benzanilide, to which has been added 23.7% Na$_2$SO$_4$ and 1.25% sodium lauryl sulfate.

Dye exhaust is nearly quantitative. In a comparison, using an unmodified MPD-I polymer yarn, it is found that less than 50% of the dye is taken up by the fiber.

EXAMPLE II

A solution of 62.7 g. (0.309 mol) of isophthaloyl chloride and one drop of concentrated sulfuric acid in 300 ml. of tetrahydrofuran (THF), is added at room temperature to a rapidly stirred solution of 30.45 g. (0.282 mol) of m-phenylene diamine, 2.61 g. (0.018 mol) N-methyl-amino-bispropylamine and 66 g. of sodium carbonate in 900 ml. of water. The reaction mixture is stirred for five minutes after which it is filtered and washed thoroughly. A polymer of 0.6 inh. viscosity is obtained.

The polymer is dissolved, with an equal amount of poly(meta-phenylene isophthalamide) of 1.4 inh. viscosity, in a solution of 10% lithium chloride in DMAc. Films are cast from this solution; they are dried at 80° C., extracted in water and dried in the air. Dyeing to deeper shades than attainable with films of poly(meta-phenylene isophthalamide), is accomplished by the dyeing procedure described in Example I.

Diamines having the formula:

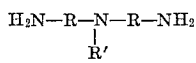

wherein R and R' are identified in the following table may be used in the present example in place of the N-methylamino-bis propylamine:

| R | R' | M.W. | Grams of diamine (0.006 mol) |
|---|---|---|---|
| $C_2H_4$ | $CH_3$ | 117.19 | 0.70 |
| $C_2H_4$ | $C_2H_5$ | 131.22 | 0.78 |
| $C_2H_4$ | n-and i-$C_3H_7$ | 145.24 | 0.87 |
| $C_2H_4$ | n-and t-$C_4H_9$ | 171.27 | 1.02 |
| $C_2H_4$ | cyclo-$C_6H_{11}$ | 185.30 | 1.11 |
| $C_3H_6$ | $CH_3$ | 145.24 | 0.87 |
| $C_3H_6$ | $C_2H_5$ | 159.24 | 0.95 |
| $C_3H_6$ | n-and i-$C_3H_7$ | 173.29 | 1.04 |
| $C_3H_6$ | n-and t-$C_4H_9$ | 187.32 | 1.12 |
| $C_3H_6$ | cyclo-$C_6H_{11}$ | 213.36 | 1.28 |
| i-$C_3H_6$ | $CH_3$ | 145.24 | 0.87 |
| i-$C_3H_6$ | $C_2H_5$ | 159.24 | 0.95 |
| i-$C_3H_6$ | n-and i-$C_3H_7$ | 173.29 | 1.04 |
| i-$C_3H_6$ | n-and t-$C_4H_9$ | 187.32 | 1.12 |
| i-$C_3H_6$ | cyclo-$C_6H_{11}$ | 213.36 | 1.28 |

EXAMPLE III

To a solution of 95.04 g. (0.88 mol) of m-phenylene diamine and 4.56 g. (0.12 mol) of N,N bis-[2-methyl-2-(3-amino benzamido) ethyl]methylamme dissolved in 1000 parts of N-dimethyl acetamide and cooled to —20° C., is added with rapid stirring 203 g. (1.0 mol) of molten isophthaloyl chloride. The solution is neutralized with lime and deaerated under vacuum to remove water and part of the solvent.

The resulting polymer solution is dry-spun. The yarn is drawn in a water bath 400% of its length, after which it is allowed to relax in steam at atmospheric pressure for 20 minutes.

The fiber thus obtained is dyed to deep shades with said dyes under 15 p.s.i.g. (1.05 kg./cm.²) and at 250° F. using as a carrier either diphenyl sulfone or dimethylphthalate.

This procedure is applicable with isophthaloyl chloride or terephthaloyl chloride or a mixture of both, and any of the possible combinations of intermediates resulting from the hydrogenation of the reaction product of m-nitro benzoyl or p-nitro benzoyl chloride with any of the diamines described in Example II.

EXAMPLE IV

To a cooled (—20° C.) solution of 101.5 g. (0.94 mol) of metaphenylene diamine and 6.55 g. (0.06 mol) of 2,6-diaminopyridine (2,6-DP) in 1000 ml. of DMAc, is added with continuous stirring approximately 203 g. of isophthaloyl chloride (the last few grams of isophthaloyl chloride is added incrementally until a negative test with dimethyl amino benzaldehyde is obtained). The viscous solution is neutralized with line and deaerated under vacuum to remove water and a small fraction of solvent. A polymer of 0.94 inherent viscosity is obtained. The polymer solution is dry-spun and the resulting yarn drawn 400% while being extracted in 90° C. water bath to remove solvent and salt.

The yarn is relaxed at 260° C. for 20 minutes. Dyeing to deep shades is accomplished with commercially available acid dyes under 15 p.s.i.g. (1.05 kg./cm.²) and at 250° C., using the procedure described in Example I.

The above procedure is also applicable to polymerizations involving the following diamines in combination with m-phenylenediamine and isophthaloyl chloride.

| $H_2N-R-NH_2$ | Formula | M.W. |
|---|---|---|
| 4,6-diamino pyrimidine | $H_2N$—[pyrimidine ring with $NH_2$] | 110.11 |
| 2,4-diamino N-methyl diphenylamine | $H_2N$—[phenyl with $NH_2$]—N($CH_3$)—[phenyl] | 213.27 |
| 2,4-diamino N-phenyl diphenylamine | $H_2N$—[phenyl with $NH_2$]—N(phenyl)—[phenyl] | 275.34 |
| 4,4-diamino N-methyl diphenylamine | $H_2N$—[phenyl]—N($CH_3$)—[phenyl]—$NH_2$ | 213.27 |

| $H_2N-R-NH_2$ | Formula | M.W. |
|---|---|---|
| N,N'-pyridino-2,6-bis[m-(or p-) aminobenzamide] | $H_2N-\phantom{xx}\underset{\phantom{x}}{\overset{O\phantom{xx}H\phantom{xxxx}H\phantom{xx}O}{\parallel\phantom{xx}|\phantom{xxxx}|\phantom{xx}\parallel}}-NH_2$ (pyridine-linked diamide structure) | 347.27 |
| 2,6-diamino trimethyl benzyl ammonium chloride | 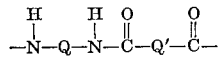 | 215.73 |

It has also been found that MPD/2,6-DP/PPD-I terpolymers having molar ratios of 70/4/26 and 24/6/70 may be used in the procedure of this example.

EXAMPLE V

To a cooled (−20° C.) solution of 108 g. (1.0 mol) of metaphenylenediamine in 1000 ml. of DMAc, is added with continuous stirring a mixture of 182.7 g. (0.9 mol) isophthaloyl chloride and 26.0 g. (0.1 mol) methyl, N-bis-(β-chlorocarbonyl ethyl)amine hydrochloride (the last few grams of the diacyl halide mixture is added incrementally, until a negative test with dimethyl amino benzaldehyde is obtained). The viscous solution is neutralized with lime and deaerated under vacuum to remove water and a small fraction of solvent. Equal parts of this solution and a similar solution containing poly(metaphenylene isophthalamide) are dry spun and the resulting yarn drawn 400% while being extracted in 90° C. water baths to remove solvent and salt.

The yarn is relaxed in saturated steam at atmospheric pressure for 20 minutes. Dyeing to deep shades is accomplished with commercially available acid dyes under 15 p.s.i.g. (1.05 kg./cm.²) and at 250° F. using as a dye carrier either diphenyl sulfone or dimethyl phthalate.

I claim:
1. A composition consisting essentially of a carbocyclic aromatic fiber forming polyamide modified by the presence of tertiary amino groups,
   (A) at least 85 mol percent but not more than 96 mol percent of the chemical repeat units of the constituents of the said composition being divalent carbocyclic aromatic amide radicals having the general formula:

$$-\overset{H}{\underset{|}{N}}-Q-\overset{H}{\underset{|}{N}}-\overset{O}{\underset{\parallel}{C}}-Q'-\overset{O}{\underset{\parallel}{C}}-$$

wherein each Q and Q' is the same or a different divalent carbocyclic aromatic radical containing no tertiary amino or quaternary ammonium groups, and wherein each imino and carbonyl group is attached directly to a carbon atom in a ring of said divalent carbocyclic aromatic radicals forming chain-extending bonds in which each Q and Q' is mutually oriented other than ortho,
   (B) up to 15 mol percent but not less than 4 mol percent of the chemical repeat units of the constituents of the said composition being a divalent amide repeat unit containing at least one tertiary amino group.

2. The composition of claim 1 consisting essentially of poly(meta-phenylene isophthalamide) modified by the presence of tertiary amino groups, at least 85 mol percent but not more than 96 mol percent of the chemical repeat units of the constituents of the said composition being metaphenylene isophthalamide radicals and up to 15 mol percent but not less than 4 mol percent of the chemical repeat units being a divalent amide repeat unit containing at least one tertiary amino group.

References Cited
UNITED STATES PATENTS

| | | | |
|---|---|---|---|
| 3,094,511 | 6/1963 | Hill et al. | 260—78 |
| 3,179,635 | 4/1965 | Frost et al. | 260—78 |
| 3,184,436 | 5/1965 | Magat | 260—78 |
| 3,260,700 | 7/1966 | Rudner et al. | 260—78 |
| 3,296,204 | 1/1967 | Caldwell | 260—78 |
| 2,671,071 | 3/1954 | Laakso et al. | 260—78 |
| 3,296,214 | 1/1967 | Pickett | 260—78 |
| 3,304,289 | 2/1967 | Ballentine et al. | 260—78 |
| 3,310,534 | 3/1967 | Brignac et al. | 260—78 |
| 3,370,044 | 2/1968 | Beaman | 260—78 |

HAROLD D. ANDERSON, Primary Examiner

U.S. Cl. X.R.

8—55; 57—140; 161—168; 260—32.4; 264—176, 210